United States Patent
Wu et al.

(10) Patent No.: US 7,916,474 B2
(45) Date of Patent: Mar. 29, 2011

(54) ELECTRONIC DEVICE WITH SELECTABLE BATTERY CONNECTION STRUCTURE

(75) Inventors: Wei Wu, Shenzhen (CN); Xin Yang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 53 days.

(21) Appl. No.: 12/544,232

(22) Filed: Aug. 20, 2009

(65) Prior Publication Data
US 2010/0328879 A1    Dec. 30, 2010

(30) Foreign Application Priority Data
Jun. 30, 2009  (CN) .......................... 2009 1 0303880

(51) Int. Cl.
*G06F 1/16* (2006.01)
*H05K 5/00* (2006.01)
*H05K 7/00* (2006.01)

(52) U.S. Cl. .............. 361/679.55; 361/679.02

(58) Field of Classification Search ............. 361/679.02, 361/679.08, 679.09, 679.55; 200/502, 564, 200/565; 429/97–100; 439/97, 500
See application file for complete search history.

(56) References Cited

U.S. PATENT DOCUMENTS

| | | | | |
|---|---|---|---|---|
| 5,205,752 A | * | 4/1993 | Taguchi et al. | 439/157 |
| 5,859,481 A | * | 1/1999 | Banyas | 307/64 |
| 6,361,359 B1 | * | 3/2002 | Du et al. | 439/500 |
| 6,531,845 B2 | * | 3/2003 | Kerai et al. | 320/107 |
| 2006/0139856 A1 | * | 6/2006 | Liu et al. | 361/600 |
| 2006/0141344 A1 | * | 6/2006 | Chen et al. | 429/97 |
| 2007/0223110 A1 | * | 9/2007 | Ge et al. | 359/699 |
| 2007/0269712 A1 | * | 11/2007 | Ju | 429/97 |
| 2008/0003860 A1 | * | 1/2008 | Carnevali | 439/296 |

* cited by examiner

*Primary Examiner* — Jayprakash N Gandhi
*Assistant Examiner* — Adrian S Wilson
(74) *Attorney, Agent, or Firm* — Zhigang Ma

(57) ABSTRACT

An electronic device includes a back cover, a mounting frame fixed to inner surface of the back cover, a battery connector, a sliding member and a driving member. The battery connector is fixed to the sliding member and is configured for connecting to a battery of the electronic device. The mounting frame includes a guide portion. The driving member driving member is connected to the back cover 20 and externally accessible and is capable of rotating in response to user operation; and sliding member is configured for moving only along the guide portion; when the driving member is rotated, the driving member drives the sliding member to move and then establish or discontinue the connection between the battery connector and the battery.

6 Claims, 6 Drawing Sheets

ELECTRONIC DEVICE WITH SELECTABLE BATTERY CONNECTION STRUCTURE

BACKGROUND

1. Technical Field

The disclosure relates to electronic devices and, particularly, to an electronic device with selectable battery connection structure.

2. Description of Related Art

Typically, portable electronic devices such as portable computers use adapters and/or rechargeable batteries as power sources. Usually, users leave the batteries in the portable electronic devices at all times due to the inconvenience of removing the batteries when not needed.

However, if the electronic device is connected to the adapter while the rechargeable battery is still in the electronic device, then it will be charged all the time, even when not needed, plus leaving the battery connected can drain it even when the device is not in use. The life of the rechargeable battery could thus be reduced.

Therefore, it is desirable to provide an electronic device to overcome the described limitations.

BRIEF DESCRIPTION OF THE DRAWINGS

The components in the drawings are not necessarily drawn to scale, the emphasis instead being placed upon clearly illustrating the principles of the electronic device. Moreover, in the drawings, like reference numerals designate corresponding parts throughout the several views.

DETAILED DESCRIPTION

Figure 1:
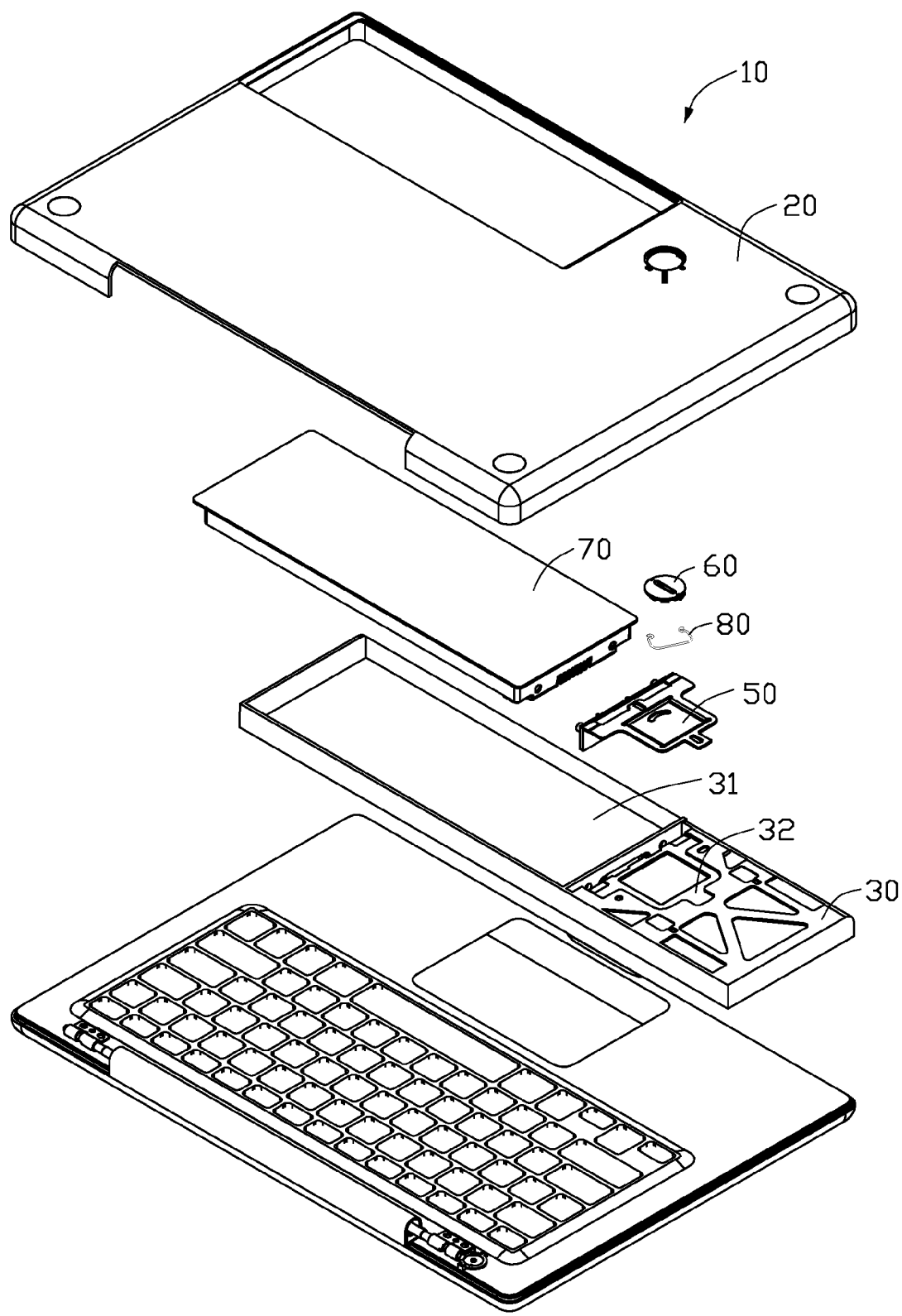
FIG. 1 is an exploded view of an electronic device according to an exemplary embodiment.
Figure 2:
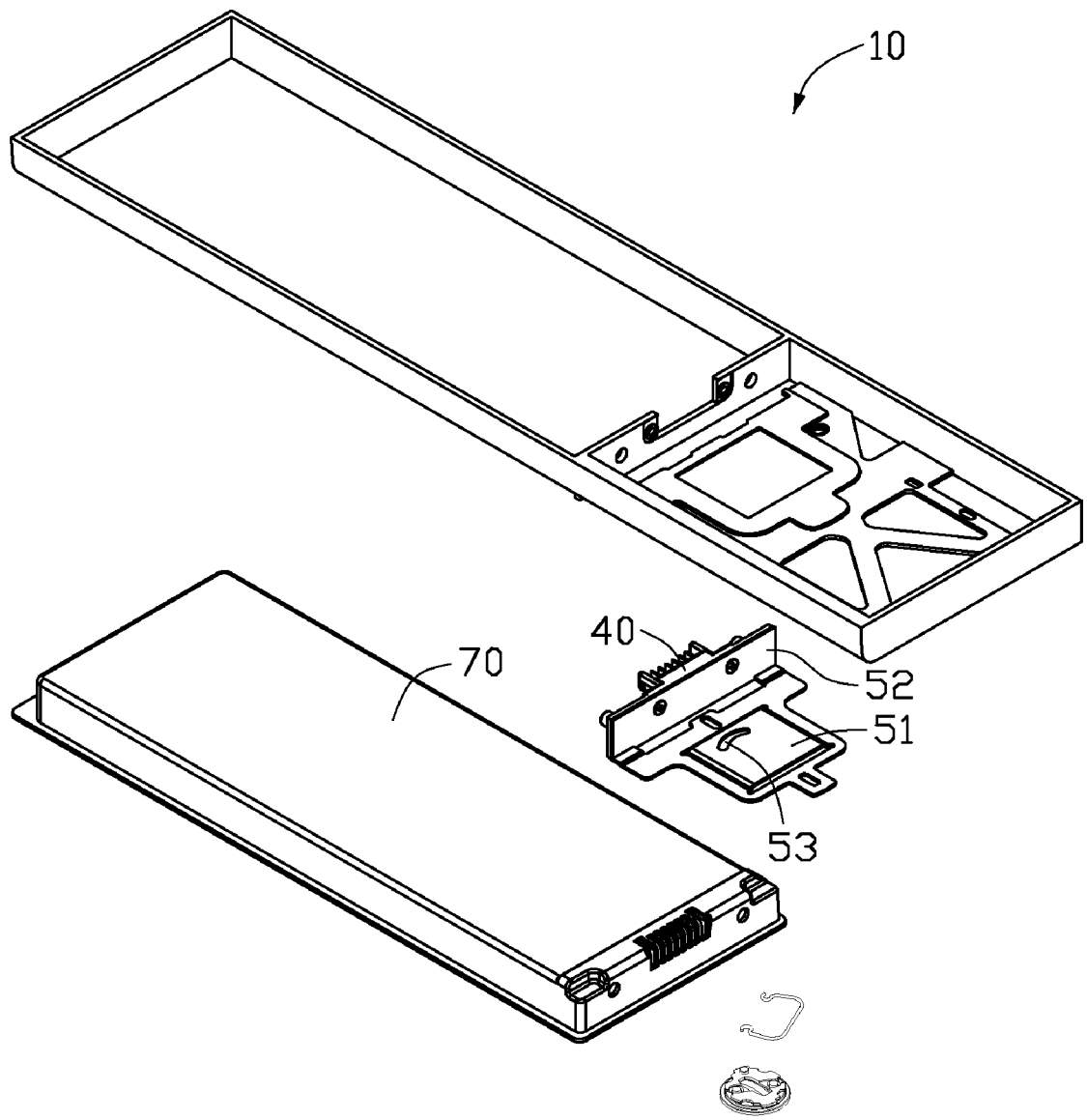
FIG. 2 is another exploded view of the electronic device of FIG. 1, showing fewer components thereof from another perspective.

Referring to FIGS. 1 and 2, an electronic device 10 includes a back cover 20, a mounting frame 30, a battery connector 40, a sliding member 50, and a driving member 60. The mounting frame 30 is securely attached to the inner surface of the back cover 20 and is used for accommodating a battery 70. The battery connector 40 is securely attached to the sliding member 50; the driving member 60 is connected to the back cover 20 and externally accessible.

In the exemplary embodiment, the mounting frame 30 has a generally rectangular shape and includes a hollow portion 31 which is used to accommodate the battery 70. The mounting frame 30 also includes a guide portion 32 formed to accommodate the shape of the sliding member 50, in the embodiment, the guide portion is a concave portion 32.

The sliding member 50 includes a base plate 51 and a connector fixing plate 52. The connector fixing plate 52 is formed in the end of the base plate 51 and is generally perpendicular to the base plate 51. In the embodiment, the base plate 51 is located between the back cover 20 and the mounting frame 30, and can only move along the lengthwise direction of the concave portion 32 of the mounting frame 30. The battery connector 40 is fixed to the outer side of connector fixing plate 52.

Figure 3:
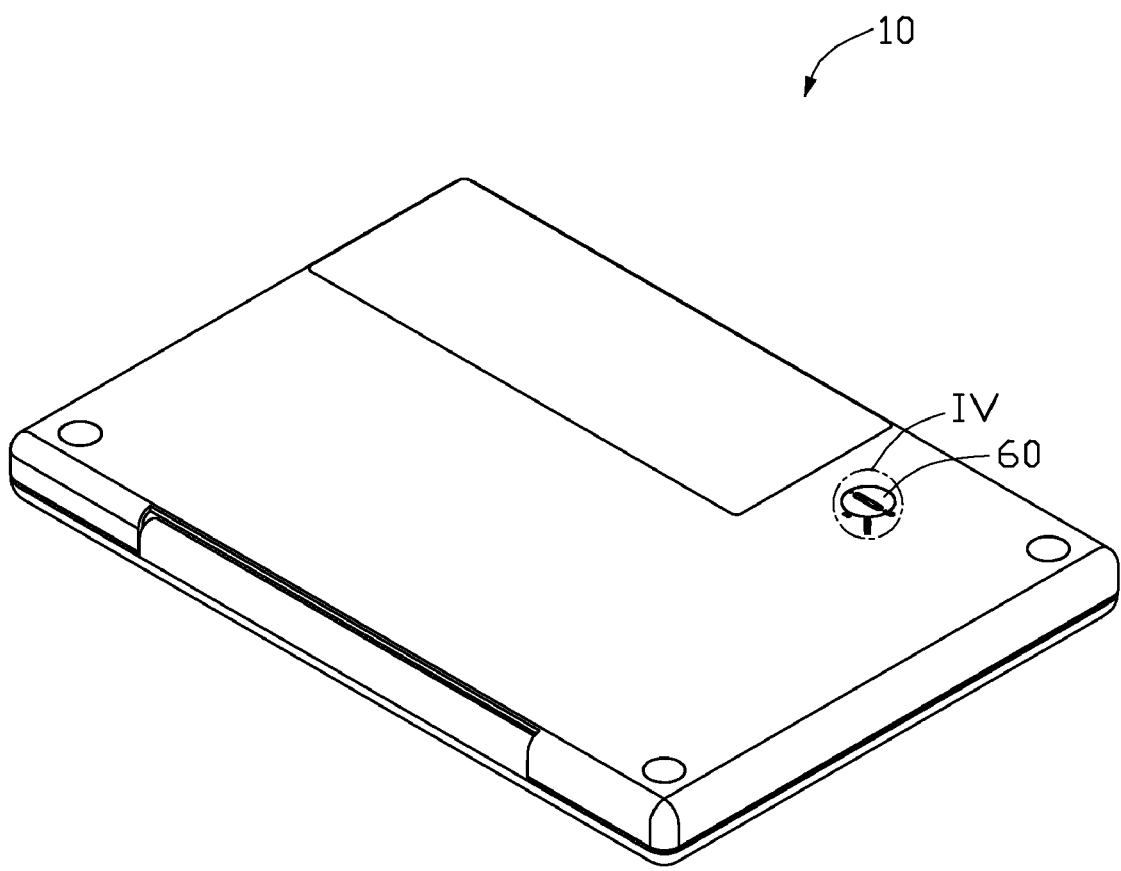
FIG. 3 is an isometric, assembled view of the electronic device of FIG. 1.
Figure 4:
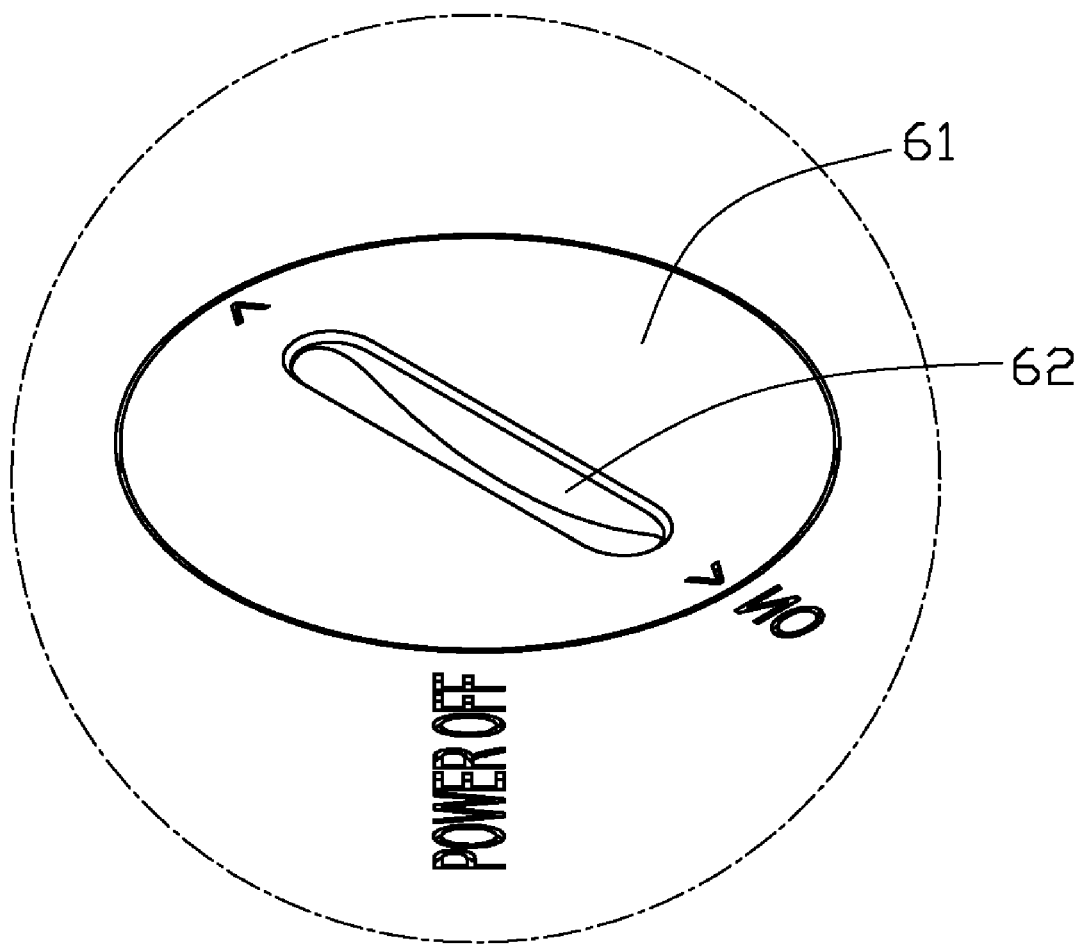
FIG. 4 is an enlarged view of a driving member of the electronic device of FIG. 1.

Referring to FIGS. 3 and 4, in the embodiment, the driving member 60 includes a top surface 61. A slot 62 is formed in the top surface 61, and a tool can be used to rotate the driving member 60 by engagement with the slot. For example, a user can use a screwdriver to rotate the driving member 60. The driving member can be rotated from a first position (the position indicated by "on" in FIG. 4) to a second position (the position indicated by "power off" in FIG. 4).

Figure 5:
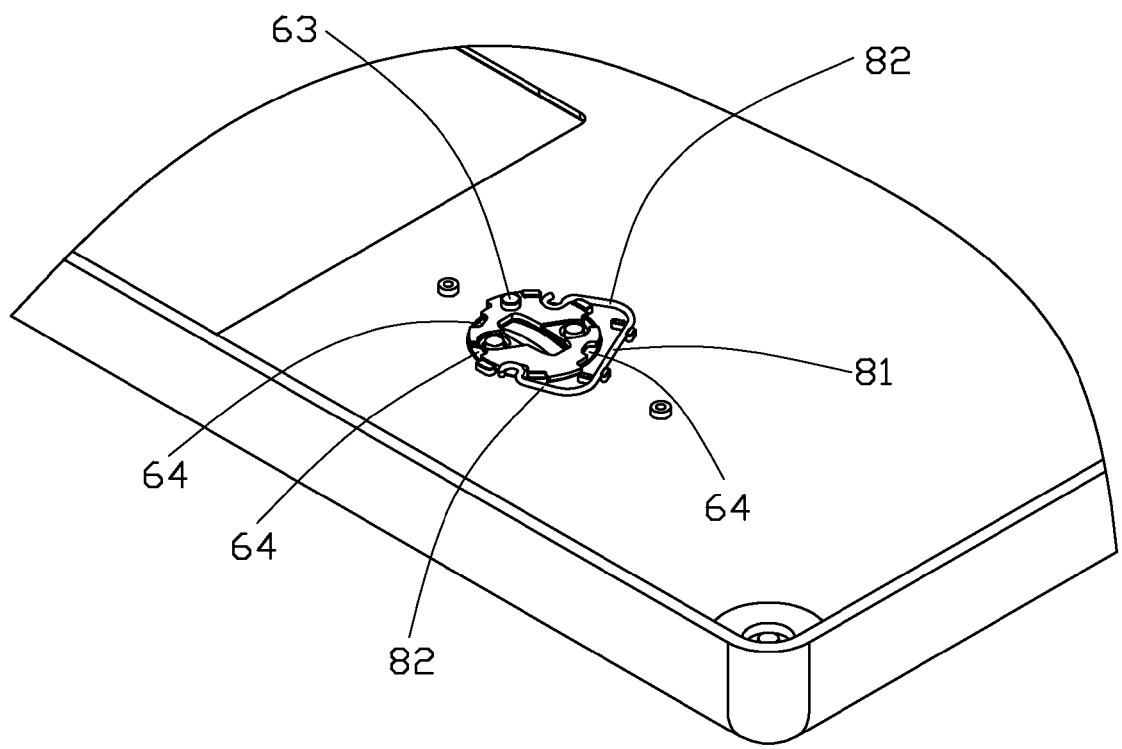
FIG. 5 is a partial view of the electronic device of FIG. 1, which shows the connection relationship between the driving member and a torsion spring.
Figure 6:
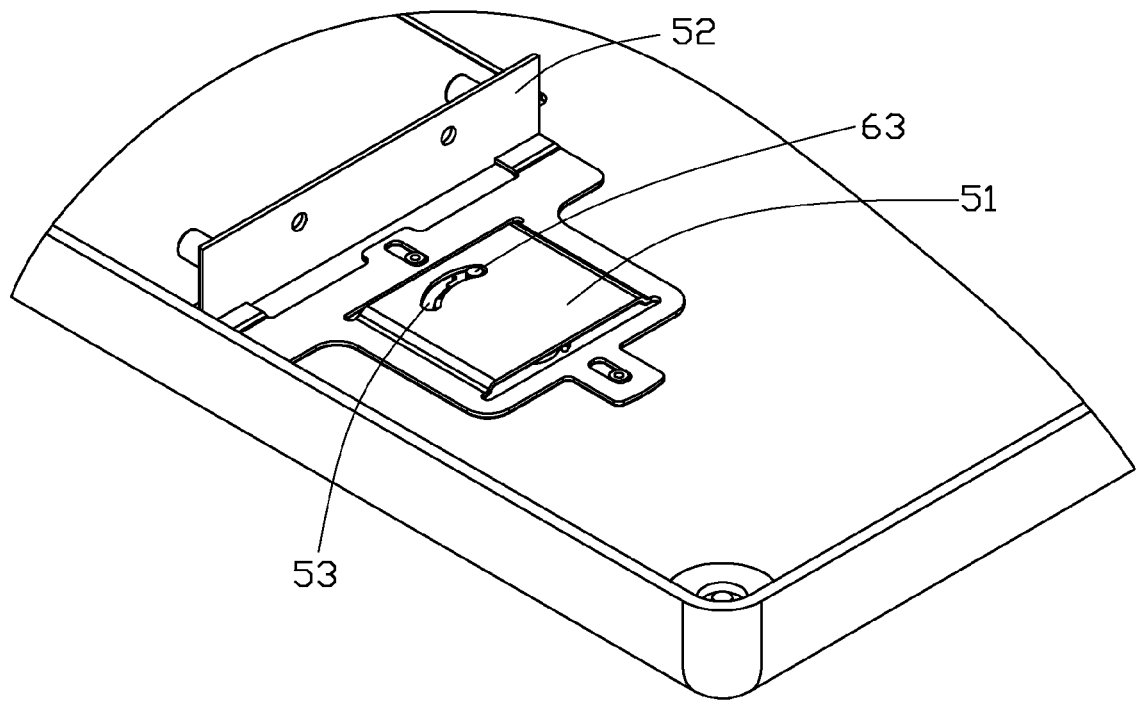
FIG. 6 is another partial view of the electronic device of FIG. 1, which shows the connection relationship between the driving member and a sliding member.

Referring to FIGS. 5 and 6, the driving member 60 also includes a bottom surface (not labeled) and a protrusion 63 protruded therefrom. The protrusion 63 is positioned away from the rotating axis of the driving member 60. In the exemplary embodiment, an arc shaped groove 53 is formed in the base plate 51 of the sliding member 50. The groove 53 is used for receiving the protrusion 63 of the driving member 60. The groove 53 is configured such that the rotating axis of the driving member 60 and the axis of the groove 53 are spaced from each other. The shape of the groove 53 is not limited the one disclosed here and may be constructed to be other suitable form.

Because the rotating axis of the driving member 60 and the axis of the groove 53 are spaced from each other, when the driving member 60 is rotated, the protrusion 63 engages the edge of the groove 53 of the sliding member 50 and pushes the sliding member 60 to move. When the driving member 60 is positioned with the slot 62 indicating the first position (the position indicated by "on" in FIG. 4), the protrusion 63 is positioned at one end of the groove 53 (see FIG. 6) and the battery connector 40 connects to a mating connector (not shown) of the battery 70.

The driving member 60 can be rotated a predetermined angle until the slot 62 indicates the second position (the position indicated by "off" in FIG. 4). In this circumstance, the sliding member 50 is driven to move to a position where the battery connector 40 disengages from the mating connector.

In the embodiment, the electronic device 10 further includes a locking mechanism that prevents unintentional rotation of the driving member 60. Specifically, a plurality of recesses 64 are formed in the bottom surface (not labeled) of the driving member 60. The recesses 64 are positioned along the edge of the driving member 60. The electronic device 10 further includes a torsion spring 80 that includes a spring body 81 and two spring arms 82. The torsion spring 80 is secured to the inner surface of the back cover 20 adjacent to the driving member 60. When the distal ends of the spring arms 82 are received in two recesses 64, the torsion spring 80 keeps the driving member 60 positioned with the slot 62 indicating the first position or the second position unless the user rotates the slot 60 with a tool.

In other embodiments, the driving member 60 can be fixed to the sliding member 50, the driving member slides along a predetermined direction relative to the back cover 20 and directly drives the sliding member to move.

Therefore, according to the present invention, the battery 70 is electrically isolated from the electronic device 10 by rotating the driving member 60 and no need to remove the battery 70.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the present disclosure.

What is claimed is:

1. An electronic device, comprising:
    a back cover;
    a mounting frame fixed to a inner surface of the back cover and comprising a guide portion formed on it;
    a sliding member,
    a battery connector securely attached to the sliding member and configured for connecting to a battery of the electronic device; and
    a driving member connected to the back cover and externally accessible; wherein,
    the sliding member is configured for moving only along the guide portion; the driving member drives the sliding member to move and then establish or discontinue connection between the battery connector and the battery.

2. The electronic device of claim 1, wherein the driving member comprises a protrusion, the sliding member comprises an arc shaped groove, the rotating axis of the protrusion of the driving member and the axis of the arc shaped groove are spaced from each other, when the driving member is rotated, the protrusion engages the edge of the arc shaped groove of the sliding member and pushes the sliding member to move.

3. The electronic device of claim 2, wherein the bottom surface of the driving member comprises a plurality of recesses, a torsion spring is secured to the inner surface of the back cover adjacent to the driving member, the torsion spring comprises two spring arms, distal ends of the two spring arms are received in two of the plurality of recesses of the driving member.

4. The electronic device of claim 2, wherein the sliding member comprises a base plate and a connector fixing plate formed in an end of the base plate and is generally perpendicular to the base plate, the battery connector is fixed to an outer side of connector fixing plate is, the arc sliding groove is formed on the base plate.

5. The electronic device of claim 4, wherein the guide portion of the mounting frame is a concave portion, the base plate of the sliding member is located between the back cover and the mounting frame and is configured for moving along the guide portion.

6. The electronic device of claim 1, wherein the electronic device is a portable computer.

* * * * *